April 2, 1935.　　　　　S. MÖHL　　　　　1,996,344
TWO AXLE BOGIES FOR AUTOMOBILES
Filed March 14, 1931
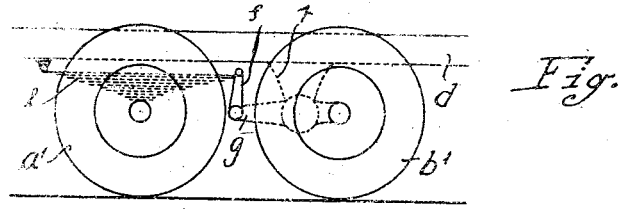
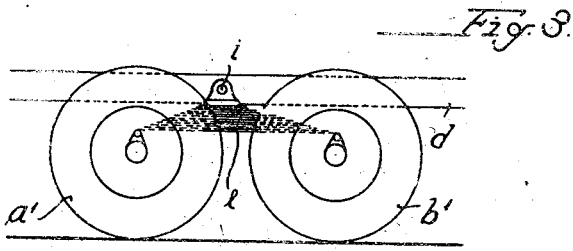
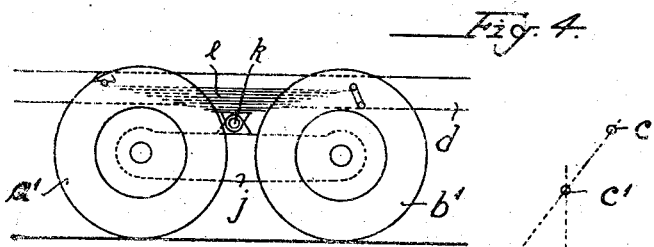
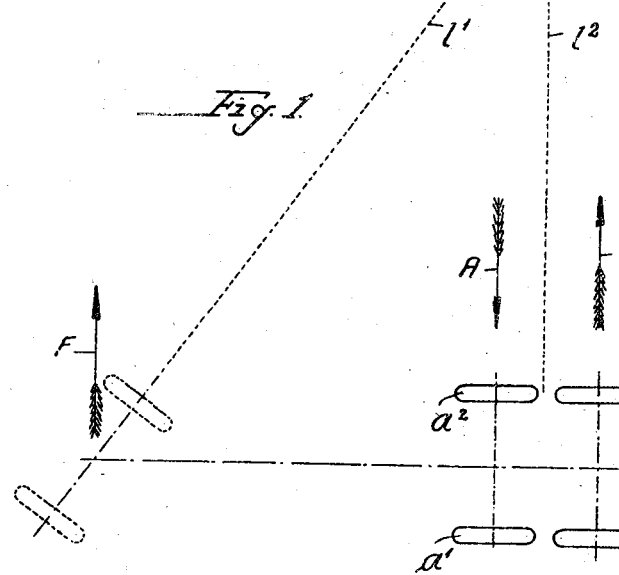
INVENTOR
Steffen Möhl,
By Whitson, Cott, Morse & Grindle
ATTYS Patented Apr. 2, 1935

1,996,344

UNITED STATES PATENT OFFICE 1,996,344

TWO-AXLE BOGIES FOR AUTOMOBILES

Steffen Möhl, Copenhagen, Denmark

Application March 14, 1931, Serial No. 522,691
In Great Britain December 11, 1930

3 Claims. (Cl. 280—80)

My present invention relates to two-axle bogies for automobiles and consists in a new and useful arrangement of the suspension of the bogie so as to secure proper distribution of the weight of the vehicle and its load on the two wheel sets, whereby certain advantages are obtained in respect to reduction of the tire wear end to the safe and convenient driving of the vehicle especially round corners and the like.

In order to reduce the wheel pressure on the road of an automobile, arising from its own weight and its load, it is common to replace an axle, usually the rear axle, of the ordinary four-wheeled vehicle by a two-axle bogie unit having two parallel axles close together, the distance of which from one another only slightly exceeds the diameter of the wheels on the said axles. This principle may be applied either to the rear axle of the vehicle or to its front axle, or to both and, as it is well known, the suspension can be arranged so that the proportion of the total load carried by each wheel remains constant no matter whether the roadway is even or uneven.

Hitherto such bogies have usually been arranged so that the loads on the two axles have been equal. If the axes of all four bogie-wheels remain approximately parallel, it is evident that some lateral skidding of the wheels must take place during the driving of the vehicle through a sharp bend in the roadway.

In order that my invention may be clearly understood reference is made to the accompanying drawing in which Fig. 1 is a schematic plan view of the wheel arrangement of an automobile having two wheels at its front end and a four-wheel bogie at its rear end, while Figs. 2–4 show some constructions of the suspension of the bogie in side views. For the sake of simplicity the front wheels are supposed in Fig. 1 to be carried by a turntable.

Referring to Fig. 1, the force owing to which the bogie wheels are made to deviate from a straight path is a transverse force F acting upon the wheels at the front end of the vehicle as it will be readily understood. This force F tries to make the four rear wheels skid, viz. the two wheels, $a^1$ and $a^2$ (Fig. 1) on the foremost bogie axle in the same direction as that of the said force F, and the two wheels, $b^1$ and $b^2$, on the rearmost bogie axle in the opposite direction. Now it can easily be shown that the force A acting on the foremost wheels, $a^1$ and $a^2$, is greater than the force B acting on the rearmost wheels, $b^1$ and $b^2$, and, besides, that, provided the loads on the four wheels are equal, the skidding will be mainly concentrated on the foremost wheels, $a^1$ and $a^2$, whereas the rearmost wheels will be more or less free from skidding.

This, of course, will also hold good in the event of the wheels at the front end of the vehicle being arranged according to the ordinary Ackerman system.

The distinguishing feature of the present invention is mainly that in a two-axle bogie for automobiles the suspension of the bogie is so arranged that the load on the foremost wheel set of the bogie and the load on the rearmost wheel set of the same are made inversely proportionate to the individual distances from the axes of the said wheel sets to the centre of the supporting wheels at the opposite end of the automobile, where a transverse force is acting on the same during a turning movement of the vehicle. By this arrangement the ratio of the load on the foremost bogie wheels, $a^1$ and $a^2$, to the load on the rearmost wheels, $b^1$ and $b^2$, will usually be in the order of roughly 10 to 8 for automobiles as presently designed, and, when the load is distributed in the said manner, the individual horizontal forces acting on all four bogie wheels will be proportionate to the vertical forces acting upon the same. Consequently no wheel will have more tendency to skid than any other and, therefore, the tire wear due to skidding on turning will be reduced to a minimum.

Another advantage obtained by the said arrangement is that the minimum turning circle for the vehicle is decreased as compared with a vehicle having the same load on the two wheel sets of the bogie. In fact the rearmost wheels, $b^1$ and $b^2$, are farthest away from the centre of the vehicle and, supposing that all four wheels are equally loaded, as usually provided for, the rearmost wheels, as pointed out above, will be more or less free from skidding. The turning centre $c$ for the vehicle as a whole, therefore, must lie approximately in the extension of the axis of the rearmost wheels, $b^1$ and $b^2$. On the other hand by applying the present invention to the bogie the turning centre $c'$ will lie on a line $l'$ pointing from the said centre $c$ towards the front end of the vehicle and, besides, at a line $l^2$ parallel to the two axes for the two wheel sets of the bogie and located somewhere between the said two axes. Thus the diameter of the turning circle will have been diminished.

A further advantage of the invention is that in many cases it renders it unnecessary to drive all of the four wheels of the bogie. As a matter of fact, in the event of the loads being equal on the two wheel sets of the bogie the adhesion of the driven wheels may be insufficient, if only one of the wheel sets is driven, whereas, provided that the entire load is unequally distributed on the wheel sets as above supposed, it will often suffice to drive the heaviest loaded wheel set, $a^1$ and $a^2$.

The two above-mentioned advantages, viz. the decrease of the diameter of the minimum turning circle and the avoidance of the necessity of driving all four bogie wheels may be so important in many cases that the load on the rearmost wheels, $b^1$ and $b^2$, of the bogie can advantageously be still further reduced relatively to the load on the foremost wheels, $a^1$ and $a^2$, than supposed above. Thereby the turning centre $c'$ will still further approach the axes of the foremost wheel set, $a^1$ and $a^2$, and, therefore, the turning circle diameter will be still further diminished. Moreover the adhesion on hills will be improved by transferring a further part of the entire weight of the vehicle from the rearmost wheels, $b^1$ and $b^2$, to the foremost ones, $a^1$ and $a^2$, and driving the latter. It must be borne in mind, however, that by further increase in inequality of loading of the two wheel sets, the above mentioned advantage in respect to minimum skidding of the wheels again will be gradually diminished.

According to circumstances the suspension of the bogie may be suitably arranged so that the ratio of the load on the foremost wheel set of the bogie to the load on its rearmost wheel set lies between the limits 10 to 9 and 10 to 6 in order to obtain maximum of total advantage in respect to reduction of tire wear by skidding and of diameter of turning circle and driving adhesion in constructions where one axle only is driven.

A bogie of the kind above related to may also be used at the front end of the vehicle instead of an ordinary single wheel set usually applied there and be combined with a similar or a six-wheel bogie or a single wheel set at the rear end of the vehicle. If the centre of the four supporting wheels of such a front bogie coincides or nearly coincides with the middle point of the axis of the ordinary wheel set substituted by the bogie, the vehicle will be able to turn practically in the same manner as when a single wheel set is used, provided, of course, that all four wheels are steered or mounted on a turn-table.

In the constructions of the suspension of the bogie shown in Figs. 2-4 $a^1$ and $b^1$ are each one of the foremost and rearmost wheels, respectively, of the bogie, $d$ the chassis and $e$ is a laminated spring interposed on each side of the vehicle between the chassis and the bogie wheels.

In Fig. 2 the said spring $e$ is fixed at one end to the chassis and at its other end connected through a rod $f$ to one arm of a two-armed lever $g$ pivotally supported by the chassis through a bracket $h$ fixed thereto and carrying at its other end the wheel $b^1$. The two wheels $b^1$ and $b^2$ (Fig. 1) are not interconnected and, therefore, can oscillate in a vertical direction independent of each other. The lengths of the two arms of lever $g$ are determined according to the invention in such a manner that the total weight of the chassis and its load is distributed as desired on the two wheel sets of the bogie.

In Fig. 3 the spring $e$ is attached at a point $i$ between the axles of wheels $a^1$ and $b^1$ the said point being determined according to the invention so that the desired distribution of the weight on the two wheel set is obtained, the wheels being supported on the two ends of the spring.

In Fig. 4 the two axles of the wheels $a^1$ and $b^1$ are interconnected by a bar $j$ on which the spring rests at a certain point $k$ between the wheel axes, the spring being connected at both ends to the chassis. The location of the point $k$ is determined in the same manner as the location of point $i$ in Fig. 3.

Having now particularly described and ascertained the nature of my said invention and in what manner the same is to be performed, I declare that what I claim is:

1. A motor vehicle suspension system comprising a vehicle chassis, vehicle wheel groups located adjacent opposite ends of the chassis, one of said wheel groups including two wheel sets displaced longitudinally of the vehicle, and means including a lever system for supporting the chassis on said wheel sets, the leverage of said system being such that the ratio of the distribution of the load on the wheel sets is substantially inversely proportional to the ratio of the distances between the wheel sets and the wheel group at the opposite end of the chassis.

2. A motor vehicle suspension system comprising a vehicle chassis, vehicle wheel groups located adjacent opposite ends of the chassis, one of said wheel groups including two wheel sets displaced longitudinally of the vehicle, and means including a lever system for supporting the chassis on said wheel sets, the leverage of said system being such that the ratio of the distribution of the load on the wheel sets is substantially inversely proportional to the ratio of the distances between the wheel sets and the wheel group at the opposite end of the chassis, the ratio of the distribution of the load lying between the limits 10 to 9, and 10 to 6.

3. In a two-axle bogie for automobiles a suspension arrangement comprising a double-armed lever on each side of the bogie and supporting at each of its two free ends one of the wheels of the bogie, said lever being pivoted on the chassis frame, the two arms of the said lever having each a length such that the load on the bogie wheel set nearest to the center of the vehicle and the load on the bogie wheel set farthest from the said center are practically inversely proportional to the individual distances from the axes of the said bogie wheel sets to the center of the wheel group at the opposite end of the vehicle, the ratio of the former load to the latter load lying between the limits 10 to 9, and 10 to 6.

STEFFEN MÖHL.